United States Patent [19]

Canterino

[11] 4,242,465
[45] Dec. 30, 1980

[54] FIRE RESISTANT FOAM INSULATION

[75] Inventor: Peter J. Canterino, Towaco, N.J.

[73] Assignee: Mobil Oil Corporation, New York, N.Y.

[21] Appl. No.: 108,901

[22] Filed: Dec. 31, 1979

[51] Int. Cl.$^3$ .............................................. C08J 9/04
[52] U.S. Cl. ............................ 521/88; 260/45.75 B; 260/45.95 G; 521/92; 521/139; 521/146; 521/907; 521/915
[58] Field of Search ................ 521/88, 92, 139, 146, 521/907, 915

[56] References Cited

U.S. PATENT DOCUMENTS

| | | | |
|---|---|---|---|
| 2,857,625 | 10/1958 | Carlson, Jr. | 521/79 |
| 3,060,513 | 10/1962 | Klinck et al. | 521/915 |
| 3,242,238 | 3/1966 | Edberg et al. | 521/915 |
| 3,331,899 | 7/1967 | Ismael | 521/915 |
| 3,515,615 | 6/1970 | Okada et al. | 204/159.2 |
| 3,640,913 | 2/1972 | Cerra | 521/915 |
| 3,725,317 | 4/1973 | Roden et al. | 521/79 |
| 3,832,312 | 8/1974 | Wright | 204/159.2 |
| 4,085,073 | 4/1978 | Suh et al. | 521/79 |

*Primary Examiner*—Morton Foelak
*Attorney, Agent, or Firm*—Charles A. Huggett; Hastings S. Trigg

[57] ABSTRACT

This invention provides cross-linked, flame retarded poly(p-methylstyrene) foam insulation. It also provides a method for preparing it, that comprises incorporating a flame retarding amount of flame retardant material into poly(p-methylstyrene), foaming the resultant composition, and cross-linking.

4 Claims, No Drawings

FIRE RESISTANT FOAM INSULATION

BACKGROUND OF THE INVENTION

1. Field of the Invention

This invention is directed to improved fire resistant foam insulation and a method for preparing it.

2. Description of the Prior Art

Fire retardant polystyrene foam has been proposed for insulation material. In the case of exposure to flames (fire), however, such material is disadvantageous, because it can melt and flow on exposure to heat and cause flames to spread. Foam insulation prepared in accordance with the present invention does not melt and flow and thus does not have the disadvantages of the polystyrene foam material.

SUMMARY OF THE INVENTION

This invention provides cross-linked, flame retarded poly(p-methylstyrene) foam insulation.

It also provides a method for preparing it, that comprises incorporating a flame retarding amount of flame retardant material into poly(p-methylstyrene), foaming the resultant composition, and cross-linking.

DESCRIPTION OF SPECIFIC EMBODIMENTS

The monomer used in preparing the homopolymer or copolymers from which the foam insulation of this invention is made is p-methylstyrene. It is within the contemplation of this invention to use mixtures of methylstyrene rich in p-methylstyrene. Such mixtures contain at least 90 weight percent, preferably 95 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolymers containing between about 10 and about 1 weight percent conjugated diene, such as butadiene and isoprene. The polymerization reaction is carried out by using methods and catalysts well known in the art for polymerizing styrene. The reaction can be carried out in solution, bulk, suspension, or emulsion.

The flame retardants utilizable in the foam insulation of this invention can be any of the well known flame retardants for thermoplastic polymers, including but not limited to chlorowax, haloorganophosphorous compounds, and inorganic fluoborates. The flame retardant can be a single material or a mixture of several materials. One type of flame retardant is the addition product of phosphorus, carboxylic, or sulfonic acids with a bicyclic phosphite disclosed in U.S. Pat. Nos. 3,789,091 and 3,849,368, which are incorporated herein by reference. Typical utilizable mixtures are disclosed in U.S. Pat. No. 3,635,866, which is incorporated herein by reference. Other utilizable phosphonate mixtures are disclosed in U.S. Pat. No. 4,144,387, which is incorporated herein by reference. The flame retardant amounts of flame retardant can vary dependent upon the nature of the material used. Generally, they will be 2 to 30 percent, preferably 4-16 percent, based upon the weight of the total composition.

The flame retardant can be incorporated into the p-methylstyrene polymer by any of the methods well known in the art. These include Banbury mixer, differential speed mill, and extruder mixing. A feasible method is to meter the desired amount of flame retardant with the polymer into the hopper of an extrusion apparatus.

The blend of p-methylstyrene polymer and flame retardant is foamed and formed into suitable shapes for insulation, such as boards, sheets, blocks, etc.

The manner by which foamed insulation is prepared from the aforedescribed polymer or copolymer blends is not an essential feature of this invention. The general methods of forming foamed articles are discussed in U.S. Pat. No. 3,444,283 which is incorporated herein by reference. The preferred method is a direct injection extrusion operation described in U.S. Pat. No. 3,444,283. Reference is made herein to U.S. Pat. No. 3,619,445, incorporated herein by reference, which described the complete direct injection extrusion foam lines. Ser. No. 506,836, referred to in U.S. Pat. No. 3,619,445, is now U.S. Pat. No. 3,444,283. As described in these incorporated patents, nucleating or cell size control agents can be used.

After it has been formed, the foam insulation is cross-linked. This can be effected by chemical means, using known cross-linking agents, such as peroxides. Also, cross-linking can be effected by ionizing radiation. Ionizing radiation is inclusive of extremely short-wavelength, high energetic, penetrating rays such as gamma rays, X-rays, and subatomic particles accelerated in cyclotrons, betatrons, synchrotrons, and linear accelerators. The effect of irradiating the shaped articles is to cross-link the poly(p-methylstyrene). The irradiation dose can be between about 30 megarads and about 70 megarads, preferably between about 50 megarads and about 60 megarads. If one of the well known cross-linking catalysts or accelerators is used, the dose can be lower, e.g. about 5 megarads.

EXAMPLE

PREPARATION OF FLAME RETARDANT FOAM

The compositions shown in Table I were blended in a Brabender mixer as follows:

Set Brabender for 150° C. and 35 rpm
Add polymer over 10 min. period
Add $Sb_2O_3$ over a 2 min. period
Add Tribase over a 1 min. period
Add Firemaster 680 over a 2 min. period
Add Celogen AZ over a ½ min. period
Add Dicup over a ½ min. period
Continue to blend for 2 minutes.

Fifteen-gram samples of each formula were compression molded at a temperature of 400° F., 6 minutes, at a pressure of 40,000 lbs. Plaques were 8"×8", and 15 mils thick. Upon release of pressure, the molten polymer foamed, and the plaque was dropped into a tray of water to cool it. All foams were poor in quality. The best foam was obtained from the PPMS x-linked with Dicup (B and F). However, the foams were sufficient to demonstrate the invention.

Samples of about ½×1" of B, D, F, and G were placed in toluene. Samples D and G disintegrated. Samples B and F swelled but remained intact showing that they were cross-linked.

BURNING TESTS

A tripod with two strips of metal placed on it parallel to each other and allowed to leave a 1½" long opening in the center. The foamed specimens were placed on the tripod and a bunsen burner with a 3" blue flame was placed under the opening with the flame in contact with the sample. The hood was turned off and air flow minimized during the test.

With sample D, the non-cross-linked PPMS sample, the sample melted almost immediately (12 sec.) and flowed away from the flame, some dripping to the hood floor. The same happened with sample G, a polystyrene formulation with peroxide similar to sample F.

This formulation was included to show that PS cannot give cross-linked foams as the PPMS does.

Samples B and F represent cross-linked PPMS. B contained some POLYMIST A12 (a polyethylene resin) found to help the cross-linking of PPMS.

B and F behaved the same; they did not melt and flow away. After 60 seconds of contact with the flame of the bunsen burner, the flame had still not penetrated the foam. All foams were self-extinguising. Upon removal of flame, no burning was evident. These formulations and burn test results are set forth in Table I and code for materials in Table II.

TABLE I
FORMULATIONS FOR FLAME RETARDANT FOAMS

| | Run No. | | | |
|---|---|---|---|---|
| | B | D | F | G |
| PPMS 4497 | 40 | 40 | 40 | — |
| PS 110S | — | — | — | 40 |
| Sb$_2$O$_3$ | 4.0 | 4.0 | 4.0 | 4.0 |
| Tribase AG | 1.2 | 1.2 | 1.2 | 1.2 |
| Firemaster 680 | 8.0 | 8.0 | 8.0 | 8.0 |
| Celogen AZ 199 | 0.8 | 0.8 | 0.8 | 0.8 |

TABLE I-continued
FORMULATIONS FOR FLAME RETARDANT FOAMS

| | Run No. | | | |
|---|---|---|---|---|
| | B | D | F | G |
| Polymist A 12 | 0.4 | 0.4 | — | — |
| Dicup | 0.4 | — | 0.4 | 0.4 |
| Time to Melt and Drip, sec. | >60 | 12 | >60 | 12 |

TABLE II
CODE FOR MATERIALS

PPMS - poly (p-me styrene), 97%, para
PS 110S - commercial polystyrene grade
Sb$_2$O$_3$ - Antimony Oxide
Tribase AG - stabilizer for flame retardant
Firemaster 680 - brominated diphenyl ether
Celogen AZ - Azodicarbonamide
Dicup - dicumene peroxide Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. Cross-linked, flame retarded poly(p-methylstyrene) foam insulation, said poly(p-methylstyrene) containing at least 90% para isomer, and containing an effective amount of a flame-retardant material.

2. A method for preparing the insulation of claim 1, that comprises incorporating a flame retarding amount of flame retardant material into poly(p-methylstyrene) containing at least 90% para isomer, foaming the resultant composition, and cross-linking.

3. The method of claim 2, wherein said flame retardant is a mixture of antimony oxide and brominated diphenyl ether.

4. The method of claim 2 or 3, wherein said composition is chemically cross-linked.

* * * * *